Oct. 8, 1929.  F. J. KAWATCH  1,731,198
RECORDING DEVICE FOR CAMERAS
Filed June 13, 1927  2 Sheets-Sheet 1
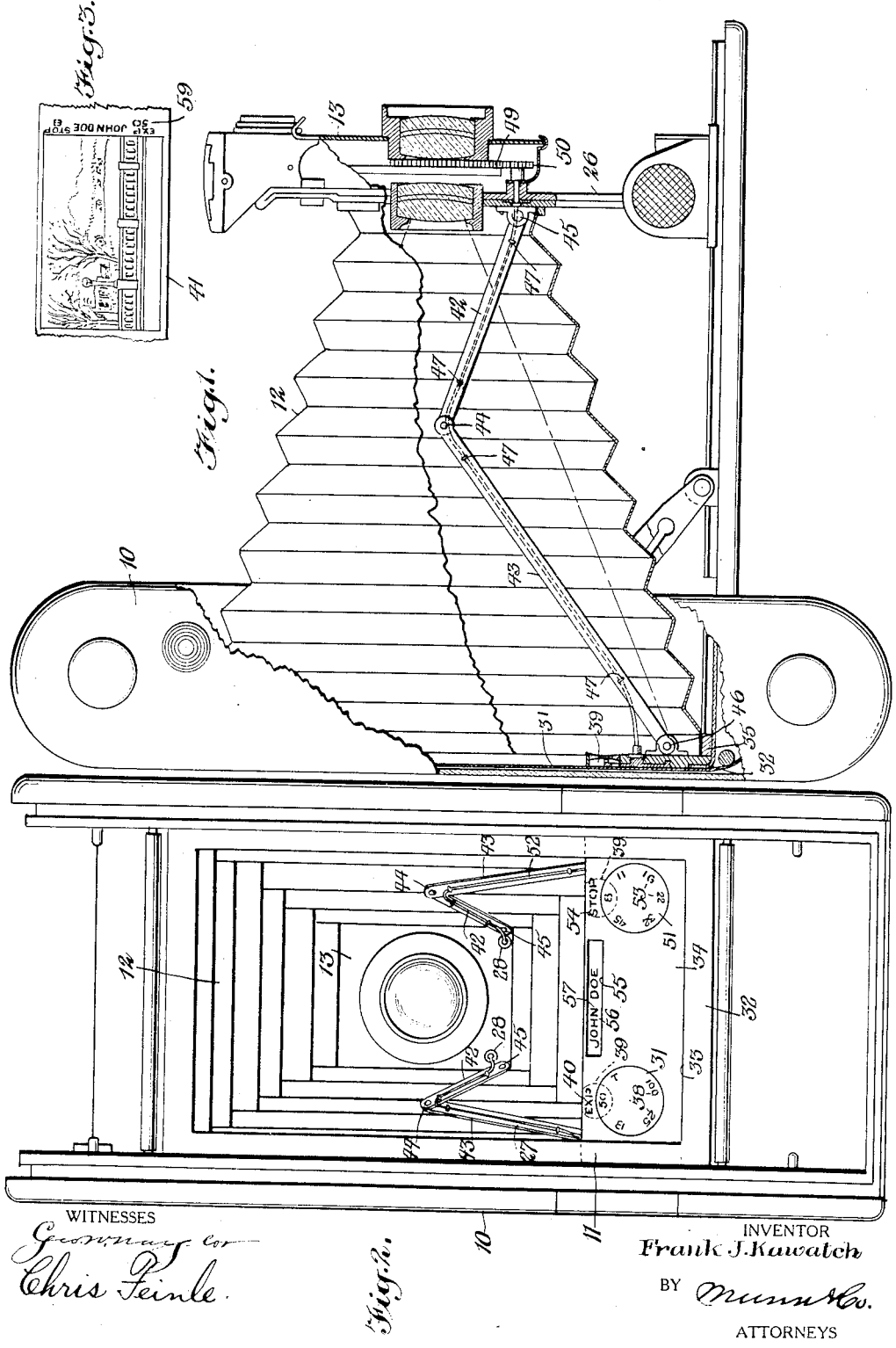
INVENTOR
Frank J. Kawatch Oct. 8, 1929. F. J. KAWATCH 1,731,198
RECORDING DEVICE FOR CAMERAS
Filed June 13, 1927 2 Sheets-Sheet 2
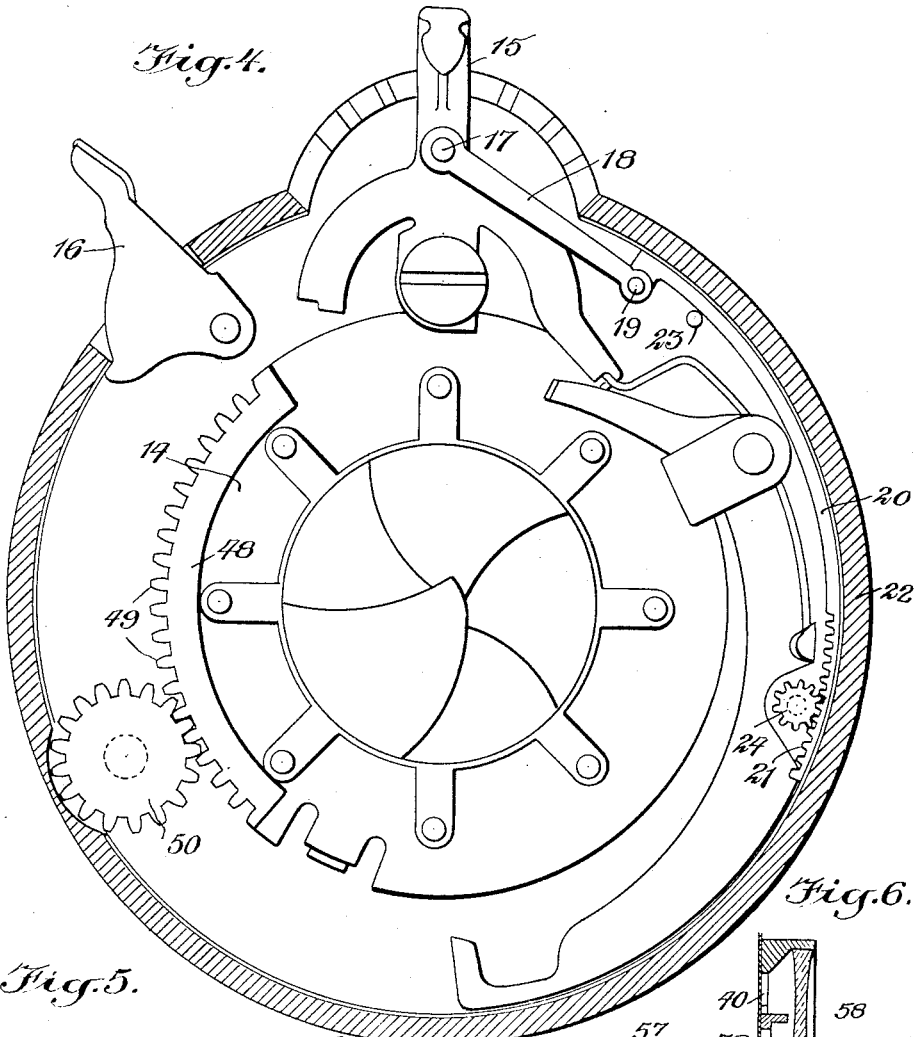
Fig. 4.
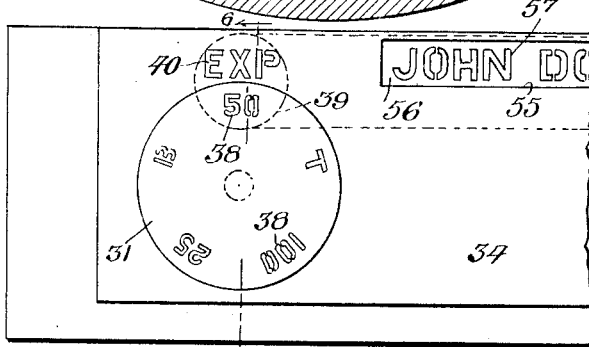
Fig. 5.
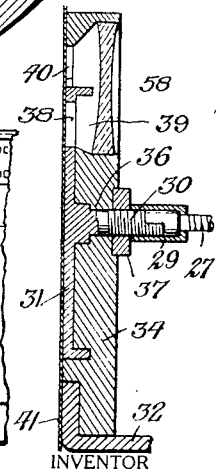
Fig. 6.
Fig. 7.
INVENTOR
Frank J. Kawatch
BY
ATTORNEYS
WITNESSES Patented Oct. 8, 1929

1,731,198

UNITED STATES PATENT OFFICE

FRANK JOSEPH KAWATCH, OF SARANAC LAKE, NEW YORK, ASSIGNOR OF ONE-HALF TO DAVID READER, OF SARANAC LAKE, NEW YORK

RECORDING DEVICE FOR CAMERAS

Application filed June 13, 1927. Serial No. 198,637.

The principal object of the present invention is to provide a camera with a device which operates for photographically recording or registering on a portion of each film or plate certain information or indicia such as the time of exposure, light aperture known as the "stop" used, and the owner's name, so that such information or indicia will appear or prove on the film when developed, and occur on the prints produced from such film or plate, to the end that a photographer will have means for denoting in connection with each picture the particular depth of focus, for obtaining a desired photographic effect, and for aiding commercial photo printers in finding films or plates, and prints inadvertently delivered to persons not the rightful owners.

Another object of the invention is to provide a camera with a device of the indicated character which will operate in conjunction with the shutter mechanism of the camera.

Another object of the invention is to provide a camera with a device of the indicated character which will produce the desired results in the use of the camera in the usual manner.

With the foregoing, other objects of the invention will appear from the embodiment of the invention, which by way of example, is described in the following specification and illustrated in the accompanying drawings, in which—

Figure 1 is a view illustrating a camera embodying the present invention, parts being shown in section, and parts being broken away to show certain features; the camera being opened for taking a picture.

Fig. 2 is a back view of the camera with the back cover removed ready for the insertion of the film.

Fig. 3 shows a print made from a portion of a developed film with a record appearing thereon produced in accordance with the invention.

Fig. 4 is a view of the camera shutter with the cover and lens removed.

Fig. 5 is an enlarged elevation showing a portion of the base which embodies the stencils, certain of which are shown.

Fig. 6 is a sectional view taken on the line 6—6 of Fig. 5.

Fig. 7 is a section of one of the details.

In the illustrated embodiment, the invention is incorporated in a folding camera which is of well known construction. The camera includes a case 10 having an aluminum body and frame including a plate 11; bellows 12 connected with the plate 11; and a shutter unit or mechanism 13.

The shutter mechanism 13 is of the type including an iris diaphragm 14 which may be adjusted to produce the desired light aperture known as the "stop". On one of the faces of the shutter shell are imprinted the different stop designations as follows: 8, 11, 16, 22, 32 and 45. This serves as a guide to adjust the iris diaphragm to obtain the particular stop. These features are not illustrated as they are well known in connection with cameras. The shutter mechanism 13 also includes an exposure lever 15 which may be set according to the exposure desired, as for instance a 25th of a second, a 50th of a second, and a 100th of a second. The shutter is also operated for a time exposure and a bulb exposure. The shutter mechanism 13 also includes the means for operating the shutter, and in the present instance includes a shutter release 16.

In accordance with the present invention the exposure lever 15 has pivotally connected therewith as at 17, a link 18 which is also pivotally connected as at 19 with an arcuate rack 20 having teeth 21. The rack 20 conforms to the circular wall of the shutter shell 22 and is guided for movement in opposite directions by said wall and a pin 23 carried by the shell. A pinion 24 is mounted for rotation so that its teeth will mesh with the teeth 21 of the rack 20. The pinion 24 has a stub shaft 25 which is journaled in a bearing carried by the frame 26 of the shutter unit. A flexible cable or the like 27 is employed and one end thereof is coupled with the shaft 25 by a suitable coupling 28, and the opposite end thereof is coupled by coupling 29 to the stub shaft 30 of a metallic disk 31. The plate 11 has a lower portion 32 which is of angular construction which fits snugly into the lower corner of the case 10, and is cut out as at 33 so as not to obstruct the light area. A suitable metallic base 34 is positioned in the cut-out 33 and is held in position in any suitable manner, for instance by prongs and a band 35 which fastens the bellows 12 to the plate 11. The base 34 has a counter bore in which the disk 31 is disposed. The stud shaft 30 of the disk 31 extends through a bore 36 in the base, and the disk 31 is thus mounted for rotation. A nut 37 on the shaft 30 holds the disk 31 in place. The disk 31 is in the form of a stencil and has cut therein certain indicia 38 consisting of the numbers 25, 50, 100, and the letters T and B. The numbers 25, 50 and 100 denoting seconds of exposure, whereas, T denotes time exposure, and B denotes bulb exposure. The said indicia is arranged circumferentially of the disk 31 so that the numbers and letters may be brought respectively into registration with an opening 39 in the base 34. Arranged directly above the opening 39 are the letters EXP, an abbreviation of the word exposure. These letters designated 40 are cut into the base 34. It will now be understood that when the lever 15 is moved to obtain the desired exposure, movement will be transmitted to the disk 31 by virtue of the intervention of the link 18, rack 20, pinion 24 and cable 27. If the lever 15 is adjusted to obtain an exposure of a 50th of a second, the number 50 cut in the disk 31 will be brought into registration with the opening 39, and in the picture taking operation the number 50 together with the abbreviation EXP will be registered on the film. The film will be arranged behind the base 34 as shown most clearly in Fig. 6; the film being designated 41. It is to be understood that the shutter mechanism when operated for a time exposure will be accomplished by the usual time attachment for manipulating the shutter. When such time attachment is manipulated the letter T cut in the disk 31 will be brought into registration with the opening 39 for the intended purpose. It is also to be understood that the bulb attachment of the shutter when operated will cause movement of the disk 31 to bring the letter B cut therein into registration with the opening 39 for recording.

In order to keep the flexible cable 27 clear of the direct rays of the camera lens, there is provided a folding cable carrier which consists of members 42 and 43 pivotally connected together as at 44 and respectively connected for pivotal movement with the frame 26 as at 45 and with the base 34 as at 46. The cable 27 is connected with the members 42 and 43 by suitable fastening elements 47 which serve as guides.

In order to record or register on the film indicia denoting the adjustment of the diaphragm 14, or in other words to denote the light aperture or stop used there is provided on a portion of the diaphragm 14 a sector 48 having teeth 49 which mesh with the teeth of a pinion 50. The pinion 50 is mounted for rotation similarly to the pinion 24 and is connected with a disk 51 by a flexible cable 52 in a manner similar to the manner in which the pinion 24 is connected with the disk 31. The cable 52 is also arranged on and supported by a folding cable carrier similar to that on which the cable 27 is arranged and supported. The disk 51 is mounted in the base 34 similarly to the disk 31. The disk 51 is in the form of a stencil and has cut therein indicia 53 consisting of the numbers 8, 11, 16, 22, 32, and 45 which represent the "stops." The said numbers 53 are each disposed to be brought into registration with an opening in the base 34 similar to the opening 39. Above such opening are cut into the base 34 the letters forming the word Stop designated 54. It will now be understood that when the diaphragm 14 is adjusted to obtain a desired light aperture or "stop" that movement of the diaphragm will be transmitted to the disk 51 by virtue of the intervention of the sector 48, pinion 50, and cable 52. The particular "stop" number of the disk 51 will be brought into registration with the opening in the base 34. In the picture taking operation the word Stop and the particular "stop" number will be recorded or registered on a portion of the film.

In order to provide means of identification, the base 34 is provided with an opening 55 over which is arranged a stenciled plate 56 having the owner's name cut therein. In the present instance the name "John Doe" is cut in the plate 56 as an example; the same being designated 57. The plate 56 is arranged between the disks 31 and 51, as shown most clearly in Fig. 2.

In order to get a clear impression on the film negative after development of the film, there is provided a concaved lens 58 which extends across the upper edge of the base 34. The lens 58 is of a size to cover the openings 39 respectively adjacent the disks 31 and 51, the abbreviation EXP, the word Stop, and the stenciled plate 56 having the owner's name. The lens 58 may be held in place in any suitable manner in a recess formed in the base 34 by a spring frame member or projection on the plate 11. The lens 58 breaks up the image created by the camera lens and gives a clear field for the indicia to be recorded or registered.

The present invention in the ordinary use of the camera records or registers the time of exposure, the "stop" used and the owner's name on the face of the film in the picture taking operation, which serves as a record for the photographer whether professional or amateur. In the development of the film a black and white or transparent telltale or marking appears on the film adjacent the picture, as shown most clearly in Fig. 3.

From the foregoing it will be apparent that there has been described a device for a camera which serves as a means of identifying the camera against theft; that it will be an aid to the commercial photographer who develops prints for the amateur, since it will avert mistakes of giving out wrong films to a particular customer, and saves time over the old method of marking films.

It is to be understood that the invention may be put into practice with types of cameras other than the one herein briefly described.

I claim:

1. The combination in a camera, of shutter mechanism, and means operated by the operation of said mechanism for photographically recording on a photographic film arranged in the camera indicia denoting the time of exposure and "stop" used in taking a picture, said means including a rotatable indicia stencil in advance of the film.

2. In a camera, means for photographically recording on a photographic film arranged in the camera indicia denoting the time of exposure and "stop" used in taking a picture, said means including an indicia stencil in advance of the film, and a diffusing lens in advance of said stencil.

3. The combination in a camera, of a diaphragm which controls the admission of light, an indicia stencil rotatably mounted in advance of the film arranged in the camera, and means between the diaphragm and the stencil for imparting movement to the stencil in accordance with the adjustment of said diaphragm.

4. The combination in a camera, of a diaphragm which controls the admission of light, an indicia stencil rotatably mounted in advance of the film arranged in the camera, a sector having teeth on a movable part of the diaphragm, a pinion in mesh with said teeth, said pinion being rotated in response to the movement of the sector when the diaphragm is adjusted, a flexible connection between the pinion and said stencil for imparting rotational movement to the stencil in response to the rotation of said pinion.

5. The combination in a camera, of a diaphragm which controls the admission of light, an indicia stencil rotatably mounted in advance of the film arranged in the camera, a sector having teeth on a movable part of the diaphragm, a pinion in mesh with said teeth, said pinion being rotated in response to the movement of the sector when the diaphragm is adjusted, a flexible connection between the pinion and said stencil for imparting rotational movement to the stencil in response to the rotation of said pinion, and a foldable carrier which supports said flexible connection.

6. In a camera, changeable means for photographically recording indicia on a photographic film or plate while taking a picture, said means comprising cooperative relatively fixed and movable indicia stencils positioned interiorly of the camera relatively to said film or plate; and means to operate the movable indicia stencil, whereby the desired indicia will be recorded on said film or plate.

7. In a camera, the combination of shutter mechanism, changeable means for photographically recording indicia on a photographic film or plate while taking a picture, said means comprising cooperative relatively fixed and movable indicia stencils positioned relatively to said film or plate; and means operated by the operation of the shutter mechanism to operate the movable indicia stencil, whereby the desired indicia will be recorded on said film or plate.

8. In a camera, the combination of shutter mechanism, changeable means for photographically recording indicia on a photographic film or plate while taking a picture, said means comprising cooperative relatively fixed and movable indicia stencils positioned relatively to said film or plate; and means including a supported flexible connecting member operated by the operation of the shutter mechanism to operate the movable indicia stencil, whereby the desired indicia will be recorded on said film or plate.

9. In a camera, the combination of a fixed opaque plate positioned to be disposed in advance of sensitized material in the camera, said plate having a light aperture, a fixed indicia stencil in said aperture, a disk mounted for rotation on said plate, said disk having an arrangement of spaced openings constituting indices which may be singly brought into registry with said aperture, and means to rotate said disk whereby the desired index will be brought into registry with the aperture to be photographically recorded on the sensitized material, together with the indicia of said stencil, while taking a picture.

10. The invention defined in claim 9, and a lens in said light aperture.

FRANK JOSEPH KAWATCH.